Oct. 9, 1962  J. H. WIBORG  3,057,132
PACKAGING APPARATUS
Filed May 17, 1956  4 Sheets-Sheet 1

INVENTOR
James H. Wiborg
BY

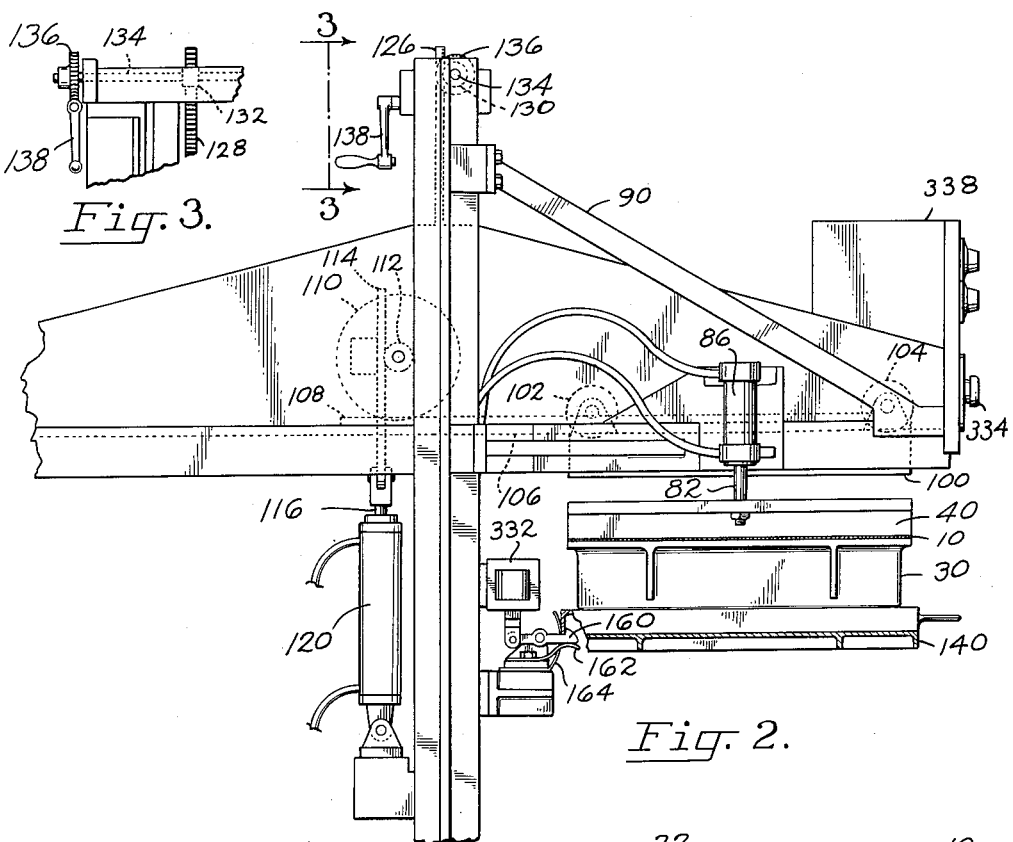
Fig. 3.
Fig. 2.
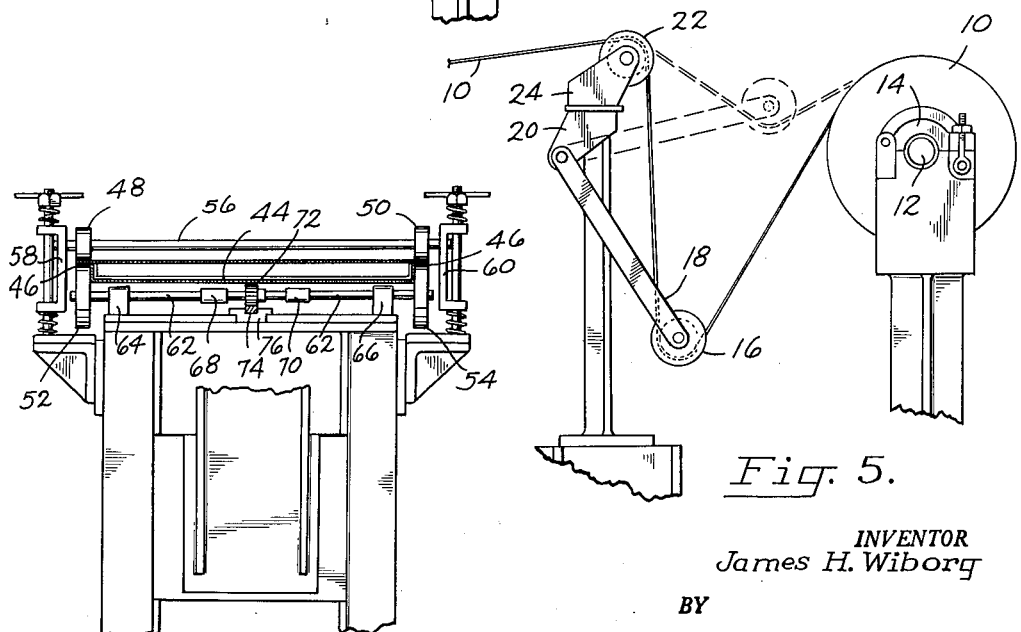
Fig. 4.
Fig. 5.
INVENTOR
James H. Wiborg

INVENTOR
James H. Wiborg

United States Patent Office 3,057,132
Patented Oct. 9, 1962

3,057,132
PACKAGING APPARATUS
James H. Wiborg, Tacoma, Wash., assignor, by mesne assignments, to Ekco Products Company, Chicago, Ill., a corporation of Delaware
Filed May 17, 1956, Ser. No. 585,418
8 Claims. (Cl. 53—112)

This invention relates to apparatus for covering articles and pertains particularly to apparatus for packaging hardware and other articles in a thermoplastic sheet. The apparatus also is applicable to the packaging of a plurality of spaced apart articles with a single sheet of plastic material.

It is a primary object of the present invention to provide apparatus for packaging articles which:

(1) Packages them securely and at the same time includes them in a unit which is adaptable for use in displaying them during mechandising operation;

(2) Displays the inherent beauty of the articles even after they are packaged;

(3) Permits detailed inspection and examination of the articles while still in a packaged condition;

(4) Is applicable to the packaging of a plurality of articles in a single package which may be subdivided easily for separation of any desired number of the articles without opening the package;

(5) Results in the formation of a package which is convenient and safe to handle and display;

(6) Permits inclusion of accessories for the articles without the necessity of packaging or handling the accessories separately;

(7) May be executed rapidly and at low cost;

(8) Encases articles and accessories therefor in a sheet of thermoplastic material;

(9) Holds a plurality of articles in uniform, spaced apart relation to each other while they are being packaged;

(10) Is applicable to the packaging of articles of varying contour and size;

(11) May be loaded with articles to be packaged easily and precisely;

(12) Discharges the packaged articles positively and rapidly;

(13) Is adaptable for use with sheets composed of the various classes of thermoplastic materials;

(14) Is adaptable for use in automatic operation;

(15) May be included as a unit in the high speed assembly line production of articles of various classes.

The manner in which the foregoing and other objects of this invention are accomplished will be apparent from the accompanying specification and claims considered together with the drawings wherein like numerals of reference indicate like parts and wherein:

FIG. 2 is a view in side elevation of the apparatus of FIG. 1, partly in section, taken on line 2—2 of that figure;

FIG. 3 is a detail elevational view taken along line 3—3 of FIG. 2 and illustrating the apparatus employed for adjusting the elevation of a heating unit employed in the herein described apparatus;

FIG. 4 is a sectional view taken along line 4—4 of FIG. 1 and illustrating a means employed for driving a plastic sheet through the herein described apparatus;

FIG. 5 is a view in front elevation further illustrating the means employed for passing a plastic sheet through the apparatus;

Figure 1:
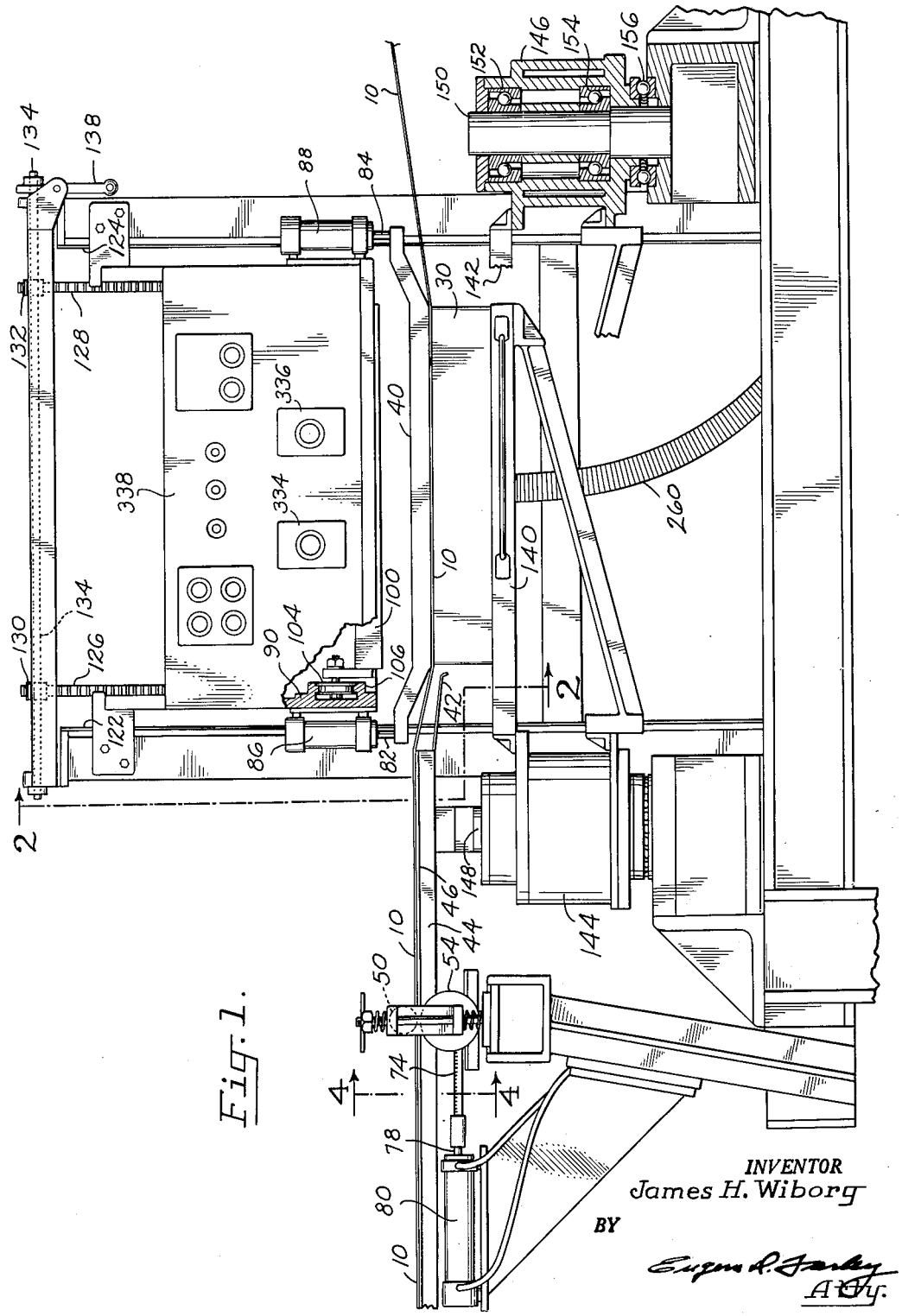
FIG. 1 is a view in front elevation of the herein described packaging apparatus.

In its broad aspect the herein described apparatus for packaging materials in a thermoplastic sheet comprises means for positioning the sheet across an article to be packaged, means for heating the sheet while thus positioned, thereby softening it, means for wrapping the softened sheet about the article, means for cooling the sheet to harden it, and means for discharging the hardened sheet and the article which it encases from the apparatus. Suitable control means also may be provided for making automatic the sequence of packaging operations.

Considering the foregoing in greater detail and with particular reference to the drawings:

The Plastic Sheet Drive

Although the plastic sheet material used for packaging the articles may be in the form either of cut sheets or rolls, it is preferred, for continuous operation, to use the rolled sheet 10 mounted on a shaft 12 which in turn is journaled in releasable bearings 14 supported by the frame of the apparatus. Sheet 10 may be comprised of those materials characterized by the property of being convertible by the application of heat from a hardened condition to a plastic condition. These materials in general include the thermoplastic resins such as the cellulose acetate resins, cellulose butyrate resins, cellulose acetate-butyrate resins, polystyrene resins, polyvinyl chloride resins, polyvinyl acetate resins, polyvinyl chloride-acetate resins, acrylate resins, methacrylate resins, the resins derived from the polymerization of acrylonitrile, and the like. These and other thermoplastic materials may be used singly or in combination with each other in the form of sheets dimensioned for use in the presently described method.

Sheet 10 may advantageously be passed through a tensioning device illustrated in FIG. 5 and comprising a roller 16 rotatably mounted between arms 18 which in turn are pivotally attached to bracket 20. The sheet then passes over a second roller 22 journaled in brackets 24. The arrangement of roller 16 and arm 18 is such that the weight of these members serves to tension the sheet and also to assist in unrolling it. As the sheet passes stepwise through the apparatus, it assumes the full outline position of FIG. 5 when it is at rest. However, when a driving force is applied to it, it assumes the dotted outline position of that figure. In both positions roller 16 and arm 18 serve to maintain it taut.

As is evident from FIG. 1, after passing over roller 22 sheet 10 passes between a selected one of mold boxes 30, 31 and a clamp 40. It then passes over an apron 42 onto a guideway 44. The latter is formed as a wide trough, the sides of which are formed with flanges 46 along which the longitudinal margins of the plastic sheet travel, the bottom of the trough serving to support and guide the relatively heavy articles which are encased in the sheet.

As the margins of sheet 10 pass over flanges 46 they are gripped between cooperating feed rolls 48, 50 and 52, 54. The upper feed rolls 48, 50 are rigid to a shaft 56 the ends of which are journaled in sprig tensioning devices 58, 60.

The lower feed rolls 52, 54 are rigid to a divided shaft 62 journaled in bearings 64, 66. Shaft 62 operates through slip gear assemblies 68, 70 which permit rolls 52, 54 to drive in one direction only, i.e. counterclockwise as viewed in FIG. 1.

Shaft 62 is driven by means of a rack and pinion drive, pinion 72 being keyed to the shaft and engaging rack 74 which operates in guideway 76. Rack 74 is coupled to the piston rod 78 of a fluid operated cylinder, e.g. air cylinder 80.

The drive thus is such that when piston rod 78 of cylinder 80 is extended, rollers 52, 54 are driven in a counterclockwise direction, thereby pulling sheet 10 through the apparatus a distance which is determined by the length of the stroke of the piston rod. However, when piston rod 78 is retracted, divided shaft 62 slips so that drive rolls 52, 54 are not rotated. Accordingly a stepwise progression of sheet 10 through the apparatus occurs.

The Clamping Unit

As the sheet passes stepwise through the apparatus it is clamped periodically to the upper surface of mold box 30 for the purpose of permitting the packaging operation to be consumated therein. In the illustrated embodiment (FIGS 1, 2 and 8), the clamping means employed comprises a clamping frame 40 dimensioned to overlie and substantially register with the upper margins of mold box 30. The opposed surfaces of mold box 30 and clamp 40 are machined so that when sheet 10 lies between them and they are pressed tightly together, the interior of box 30 is substantially sealed against access of air.

To move member 40 retractably toward sheet 10 and mold box 30, it is connected through piston rods 82, 84 to fluid operated cylinders, for example air cylinders 86, 88. These are mounted on the upper frame assembly of the unit, indicated generally at 90. Accordingly as cylinders 86, 88 operate in unison they raise and lower clamping frame 40, thereby periodically sealing off mold box 30 with the superimposed portion of sheet 10.

The Heating Unit

Means are provided for softening and rendering plastic that portion of sheet 10 which is clamped between mold box 30 and clamp 40. To this end there is provided a heating unit 100 comprising in general a horizontally disposed electric heater spanning the opening between the members of a frame of suitable dimensions. The heating unit is movable horizontally to enable alternate heating and cooling of the sheet 10. It is adjustable vertically to enable adjustment of the amount of heat supplied to the sheet as required, for example, by sheets composed of different plastic materials, or sheets of different gauge.

To make possible its horizontal movement, heater 100 is mounted on wheels, two of which are indicated at 102, 104. These roll on tracks fastened to opposite sides of frame assembly 90, one of the tracks being indicated at 106 in FIG. 1. The unit accordingly may be reciprocated between the advanced position shown in the drawings, wherein it overlies that portion of sheet 10 which is clamped between mold box 30 and clamp 40 and a retracted position wherein it is remote from that portion of the sheet.

Although various drive means may be employed for reciprocating the heating unit in the indicated manner, the illustrated guide means comprises a rack 108 connected to the unit and driven by a pinion gear 110. The latter gear in turn moves with a pinion gear 112 mounted on the same shaft and driven by a rack 114. Rack 114 in turn is connected to the piston rod 116 of a fluid actuated cylinder, such as air cylinder 120. Hence as piston rod 116 moves downwardly and upwardly, heating unit 100 is advanced and retracted respectively.

To make possible the vertical adjustment of heating unit 100 frame assembly 90 upon which it is mounted is itself mounted on a pair of vertical slides 122, 124 (FIG. 1). Its vertical position on these slides may be adjusted by a rack and pinion drive including racks 126, 128 connected to the frame assembly and driven respectively by pinion gears 130, 132. These gears in turn are keyed to a drive shaft 134, the ends of which are journaled in the frame.

Drive shaft 134 in turn is rotated by worm gear unit 136 (FIG. 3) operated by means of crank 138. Thus by turning the crank it is possible to raise and lower the entire upper frame assembly 90 to adjust the position of heater 100 with respect to that portion of sheet 10 which it overlies, cylinder 120 being disconnected while the adjustment is made.

The Mold Box

The packaging operation is carried out in one or more mold boxes 30, 31 which preferably are provided in duplicate so that one box may be loaded while the other is in operation. Each box is dimensioned to accommodate whatever articles are to be packaged. Such articles may comprise to advantage small hardware articles such as door and drawer knobs, hinges, catches, fasteners and the like. The invention is described with particular reference to the packaging of door knobs such as are used on kitchen cabinet doors, although no limitation is intended thereby.

These articles are manufactured with a coating of chromium, copper or other lustrous metal polished to a high degree. Accordingly, when packaged in a sheet of clear plastic in the manner described herein, the inherent beauty of the articles is readily visible. As a result, they may be displayed very effectively in packaged condition during merchandising operations.

The mold boxes are of substantially identical construction so that the following description of mold box 30 is also applicable to the construction of the companion mold box 31. Each of the mold boxes is supported on a suitable frame, box 30 being mounted on frame 140 and box 31 on fragmentarily illustrated frame 142. Both frames are mounted for angular movement in a horizontal plane, frame 140 being affixed to a composite bearing 144, and frame 142 to a similar bearing 146.

The bearings are rotatably mounted on posts 148, 150 respectively. Their construction is substantially identical and is illustrated in conjunction with bearing 146 (FIG. 1) from which it will be seen that each bearing assembly includes a pair of spaced, radial bearings 152, 154 and a cooperating thrust bearing 156. These assemblies make possible swinging mold boxes 30, 31 alternately between loading and packaging positions.

When in packaging position, the mold boxes are retained by a releasable fastener such as is illustrated in FIG. 2. It includes a pivotally mounted catch 160 positioned for engagement with frame 140 or 142 and is spring pressed into such engagement by means of spring 162. A spring 164 bears against the frame for urging it outwardly, i.e. toward its loading position.

As a result, when the mold box has been loaded it may be swung by the operator until the frame supporting it is engaged by catch 160, whereupon it will be in packaging position beneath clamp 40 and heating unit 100. After the packaging operation has been completed, the catch may be released by suitable means whereupon spring 164 will push the frame and mold box toward the loading position.

Each mold box comprises a box-shaped compartment open at the top and having an upper flange which substantially registers with clamp 40. (See FIGS. 6 and 7.) The bottom of the box is formed with recesses 170, 172, the function of which will appear hereinafter.

To support the articles to be packaged, there is provided a base plate 174 which is dimensioned to overlie the bottom of the box. It is perforated at 176 to provide an opening communicating with recess 172 in the bottom of the box. It also is provided with alignment pins 178.

Plate 174 supports a plurality of spaced apart, removable forms, two of which are indicated at 180. The lower ends of these forms have projecting outwardly therefrom studs 184, which extend through openings in base plate 174. Keepers 188 then may be placed over the studs to maintain the forms removably in position on the plate.

The bottom portions of forms 180 are recessed to accommodate alignment pins 178. In addition, the forms have channels 192 which interconnect the space between the forms with the top of the forms. Magnets, preferably permanent magnets 194 are embedded in the tops of the forms and sealing rings 196 of rubber or other suitable material are sealed in peripheral recesses adjacent their tops.

Annular grooves 200 are present on the peripheries of the forms. These communicate with the spaces between the forms to form a continuous channel.

In this manner there is provided a form assembly which may be used to support a number of articles to be packaged and which is readily removable from the mold box. Hence where the packaging operation is to be performed successively on a variety of items, having different sizes and contours, for example door knobs and drawer pulls, an appropriate plate-form assembly may be provided for each class of articles. These assemblies then are readily interchangeable in the mold box.

When in position in the box, each assembly may be used to support the selected articles, for example, door knobs 204. When these are placed over a form of the indicated construction, the outer margins engage sealing rings 196 in sealing engagement, forming beneath the knobs a chamber which communicates through channels 192, 176 with channel 172 in the bottom of the box.

Since door knobs 204 may have magnetic susceptibility, they are held in position by means of magnets 194. Also, if accessories such as screws 208 are to be packaged together with the knobs, these may be placed upon the same whereupon they also will be held in place by the magnets.

To assist in the loading and discharging operations the mold box contains a reciprocable platen 220. This member is formed with chambers dimensioned to guide and receive articles 204. It is supported resiliently by a spring assembly including sleeves 222, one of which is affixed to each corner of the platen and each of which is formed with opposed longitudinal slots 224, 226.

Sleeve 222 cooperates with a telescoping sleeve 228 which is rigid to the floor of the mold box. The space within the telescoping sleeves contains a compression spring 230, thee upper end of which bears against the surface of platen 220 and the lower end of which bears against a plug 232 having one or more transverse openings 234 therethrough.

A screw 236 is dimensioned to penetrate the side walls of the box, sleeve 228, slots 224, 226 in sleeve 222, and one of the channels 234 in plug 232. Thus, depending upon which of channels 234 receives the screw a greater or lesser degree of compression is imparted to spring 230. Hence there are provided four adjustable spring posts, one at each corner of the mold, resiliently supporting platen 220.

The upper surface of platen 220 is recessed to form a plurality of channels 240–244. A plate 246 overlies the platen and is affixed to the upper surface thereof. It is formed with a network of communicating small channels 248–252, one end of which communicates with channels 240–244, respectively and the other end of which communicates with a network of enlarged channels 254–258 respectively. Sheet 10 directly overlies the latter channels, which have for their function placing tear lines in the sheet, as will appear hereinafter.

The mold box also includes means for applying differential gas pressure to the opposite faces of sheet 10 which overlies it. This may be accomplished by applying a positive pressure to the outer face of the sheet or a vacuum to the underside thereof. In the form of the invention described herein, the differential pressure is applied by means of a vacuum.

To this end, mold boxes 30, 31 are provided with suction lines 260, 262 respectively. These communicate with the interior of the mold boxes and, working through an interconnecting system of channels, apply vacuum to the inside face of the sheet. They also are used to apply air pressure to the sheet to strip it from the forms at the conclusion of the packaging operation.

In the case of mold box 30, vacuum line 260 communicates with channels 172, 176, the space between forms 180, channels 200 about and through the margins of the form, and channels 192 leading into the chamber formed by the superimposition of articles 204 over the forms. In addition, suction line 260 communicates by passageways not shown with recesses 240–244 in the upper surface of platen 220 and thence with channels 248–252 and channels 254–258 in plate 246 which is placed over the platen. The applied suction thus acts to accomplish several results.

First, acting through channels 192, it evacuates the space between the articles and holds them securely in position.

Second, acting through the space above and around the articles, it sucks down softened sheet 10 so that the sheet encases the outer surfaces of the articles and is tucked around the lower margins thereof.

Third, acting through recesses 254–258 it sucks the sheet into the recesses, thinning it and forming tear lines between the articles.

Fourth, it sucks down platen 220 against the resiliency of springs 230. As a consequence, after the vacuum is shut off, springs 230 push platen 220 upwardly, stripping the sheet and the encased articles from the forms on which they are supported. In this manner, the packaged articles are discharged from the mold box.

The Control Unit

Figure 8:
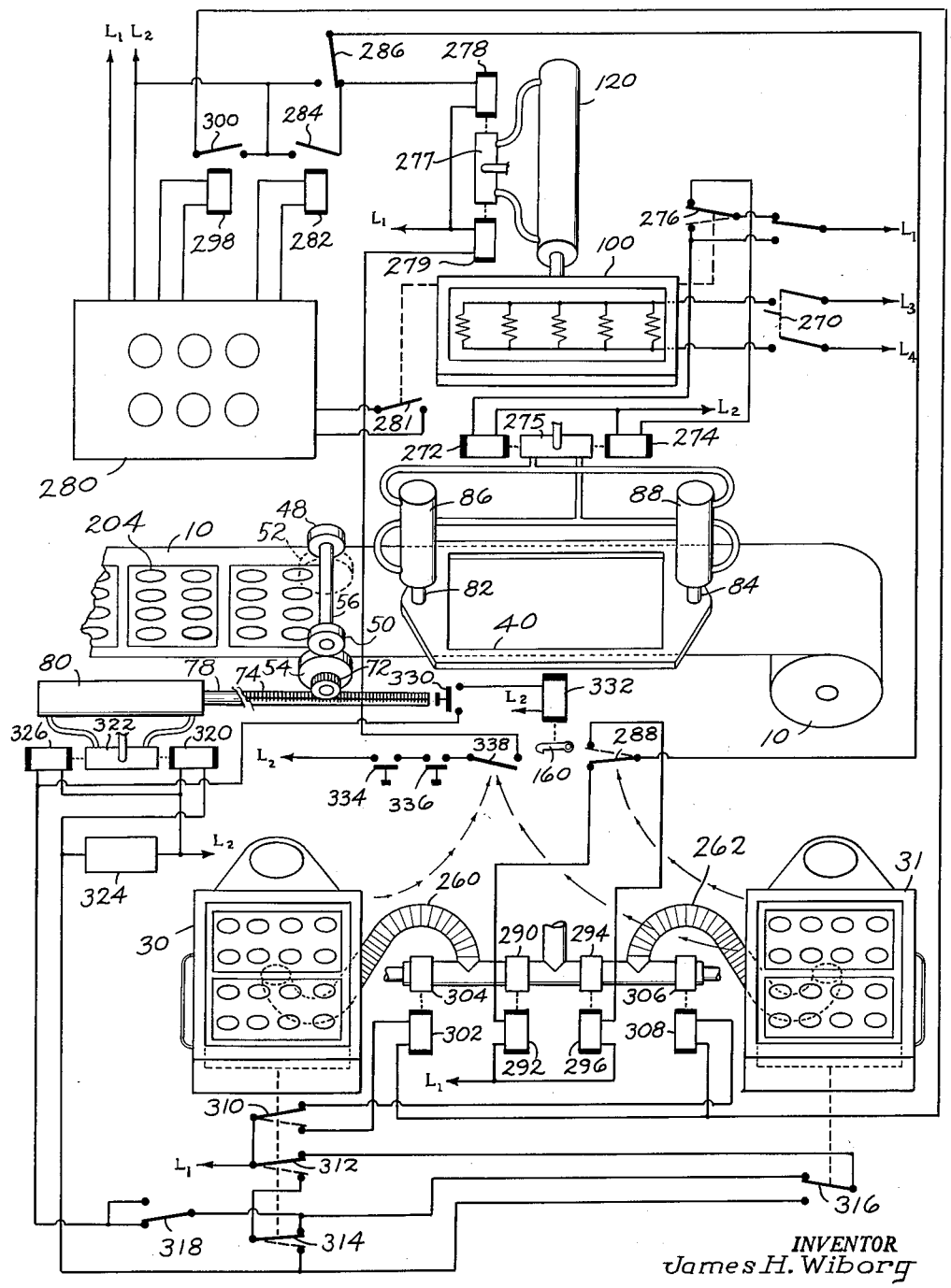
FIG. 8 is a schematic view illustrating the control system employed for controlling the herein described packaging apparatus.

As has been indicated above, the packaging apparatus of this invention is well suited for the application of an automatic electric control system. Such a system is illustrated in FIG. 8.

Current is supplied to the control system through house lines $L_1$, $L_2$. Current is supplied to the heating unit 100 through high voltage lines $L_3$, $L_4$ connected to the heating unit by means of switch 270.

The clamping unit 40 for clamping sheet 10 to mold box 30 is controlled through solenoids 272, 274 which cause valve 275 to direct air or other fluid into cylinders 86, 88 in such a manner as to lower or raise respectively clamp 40. These two solenoids in turn are controlled by means of two-way switch 276, which is linked mechanically to reciprocable heating unit 100.

Heating unit 100 is reciprocated by cylinder 120, controlled by valve 277 which is operated by solenoids 278, 279.

The application of vacuum or air pressure to mold boxes 30, 31 through lines 260, 262 is controlled by means of a timer 280 which is energized when a switch 281 is closed. The timer operates a spring pressed vacuum valve 290 through a circuit including solenoid 282, solenoid operated switch 284, manual switch 286, switch 288 and solenoid 292.

In the case of mold box 31, the application of vacuum is controlled through the same system with switch 288 placed in its dotted outline position, thereby operating alternate spring pressed vacuum valve 294 by energizing solenoid 296.

The flow of air through lines 260, 262, occurring near the completion of the cycle to assist in stripping the packaged articles from the form, also is controlled through timer 280. In this case the timer acts through solenoid 298, solenoid operated switch 300 and solenoid 302 to operate spring pressed air valve 304. In the case of mold box 31, the flow of air into the box at the conclusion of the operation through line 262 is controlled by spring pressed air valve 306 operated by means of solenoid 308.

The drive which advances the plastic sheet 10 stepwise through the apparatus is controlled by movement of the platens 220 in the mold boxes. Thus the platen of box 30 is linked mechanically to switches 310, 312, 314. The platen of box 31 is linked mechanically to switch 316 which is in a circuit with manual-automatic switch 318.

Accordingly as one or the other of the platens lowers upon the application of a vacuum it energizes solenoid 320. This operates valve 322 which in turn controls the flow of air through cylinder 80 so that rack 74 is retracted. This motion of the rack has no effect on the sheet 10, because of slippage in divided drive shaft 62.

Lowering of the platen also energizes counter 324. This counts the number of packaged units processed by the apparatus.

When the platen moves upwardly, at the conclusion of the operation after the vacuum has been released and air pressure applied, solenoid 326 is energized. This adjusts valve 322 so that rack 74 on cylinder 80 is extended, thereby actuating drive rolls 52, 54 and advancing sheet 10 by an increment determined by the stroke of the cylinder.

Latch 160 which releases the mold box and pushes it outwardly, is actuated by the movement of rack 74. This movement operates switch 330, and closes a circuit including solenoid 332 which operates to release the latch.

The entire circuit is controlled by master switches 334, 336 on a control panel 337. To prevent inadvertent initiation of a cycle, both switches must be closed simultaneously.

The circuit is controlled as required to include either mold box 30, or mold box 31, by means of switches 288, 338. When box 30 moves to loading to packaging position, it closes switch 338. When mold box 31 moves between these two positions, it closes switches 288, 338. This in turn closes the circuits as required for inclusion of the appropriate vacuum and air valves as will appear in the detailed description of the operation of the apparatus.

*Operation*

In the operation of the presently described packaging apparatus one of the mold boxes, for example mold box 30, is placed in the loading position illustrated in FIG. 8. The articles to be packaged, for example, door knobs 204 then are placed upon the supporting forms 180. There they are supported by rubber sealing rings 196 which have the dual functions of sealing off the chamber formed by the knobs and forms, and also preventing scratching of the knobs. The loading of the knobs is facilitated by the guiding effect of the side walls of the recesses in platen 220 in which the knobs are contained.

The knobs are maintained in position at first by the action of magnets 194. Also, accessories such as screws 208 may be placed on the outer surfaces of the knobs and maintained there by the action of the magnets.

The mold box next is swung over to its packaging position where it is directly beneath clamp 40, heater 100 and a section of plastic sheet 10. This movement closes switch 338 and latch 160.

An automatic packaging cycle then is initiated by closing switches 334 and 336, which in turn closes a circuit including these two switches as well as switch 338, solenoid 279 and house lines L₁ and L₂. Solenoid 279 acts to adjust valve 277 so that air is admitted to cylinder 120. This advances heater 100, which is maintained continuously at the predetermined temperature by closing a circuit including the heater, manual switch 270 and high voltage house lines L₃, L₄.

The advancement of heater 100 lowers clamp 40 by moving switch 276 to its dotted outline position and thereby closing a circuit including that switch as well as solenoid 272 which operates valve 275. This valve in turn admits air to cylinders 86, 88 so that the frame-like clamp 40 is clamped down upon the section of sheet 10 immediately above the mold box.

The advancement of heating unit 100 also starts timer 280 by closing switch 281.

After an interval predetermined to be sufficient for heater 100 to soften sheet 10, the timer energizes a circuit which retracts the heater. This is accomplished through a circuit including solenoid 282, solenoid operated switch 284 and solenoid 278. The latter solenoid adjusts valve 277 so that air is admitted to the opposite side of cylinder 120, retracting heating unit 100. As the heating unit retracts, it opens switch 281 so that the timer, which is still operating, will be ready for another cycle of operation after the completion of the described cycle.

Retraction of heating unit 100 also moves switch 276 to its full line position. This closes a circuit including solenoid 274. Energization of this solenoid operates valve 275 so that air is admitted to the opposite sides of cylinders 86, 88 lifting clamp 40.

In the meantime, closure of switch 284 by timer-operated solenoid 282 has also energized a circuit including switch 284, switch 286, switch 288 (which is closed because box 31 is in its loading position) and solenoid 292. This solenoid in turn operates the spring loaded valve 290, connecting the interior of box 30 with vacuum line 260.

Suction thus is applied to the under surface of heat-softened sheet 10 opposite the mold box through an interconnecting network of channels including channels 172, channels 176, the spaces between forms 180 and channels 200. It is applied also to channels 240–244 which in turn communicate through channels 248–252 with channels 254–258. Still further, suction is applied through channels 192 to the chambers formed beneath the convex surfaces of the articles.

As the result of this application of vacuum several effects occur. Platen 220 is depressed from the position of FIG. 6 to the position of FIG. 7, this depression occurring against the resilient force of springs 230. Softened sheet 10 is wrapped about articles 204 and superimposed accessories 208. It is tucked around the edges of the knobs so that it retains them effectively.

Also, the vacuum applied through channels 254–258 sucks in segments of the sheet, forming thinner tear lines. Still further the application of suction to the chamber beneath the knobs holds them securely in place so that they will not become displaced by any movement of the plastic case.

Depression of platen 220 by the vacuum also moves switches 310, 312, 314 to the dotted line positions of FIG. 8. Altering the switches in this manner has several effects.

First it closes a circuit including counter 324, switch 314 and switch 312. This records the number of units which have been packaged.

Second, it energizes solenoid 320 by completing a circuit including the solenoid, switch 314, and switch 312. Energization of this solenoid operates valve 322, retracting rack 74 attached to the piston of cylinder 80. The linkage interconnecting the rack and the drive rolls 52, 54 slips during this operation so that no movement of sheet 10 occurs. Retraction of rack 74 opens switch 330 so that latch 160 remains closed.

Third, by altering the position of switch 310 it sets up for a subsequent step a circuit including solenoid 302 controlling air valve 304.

Next, timer 280 operates to de-energize solenoid 282. As a result solenoid operated switch 284 is opened, opening the circuit including solenoid 292. As a consequence vacuum valve 290 is closed so that vacuum no longer is applied to mold box 30. The plastic sheet now has become cold and rigid because of the removal of heater 100 and contact of the sheet with cold surfaces.

Next, timer 280 energizes solenoid 298. This closes switch 300, completing a circuit including the latter switch as well as solenoid 302 and switch 310 which has just been closed by movement of the platen. Solenoid 302 in turn opens air valve 304 so that air is admitted to the mold box through line 260.

The air follows the various channels heretofore described in connection with the application of vacuum, and impinges against the under surface of sheet 10. Accordingly it strips the sheet from forms 180. It also strips it from the upper surface of plate 246 and out of channels 254–258. In this manner, the sheet and the packaged articles which it encases are ejected from the apparatus.

Figure 6:
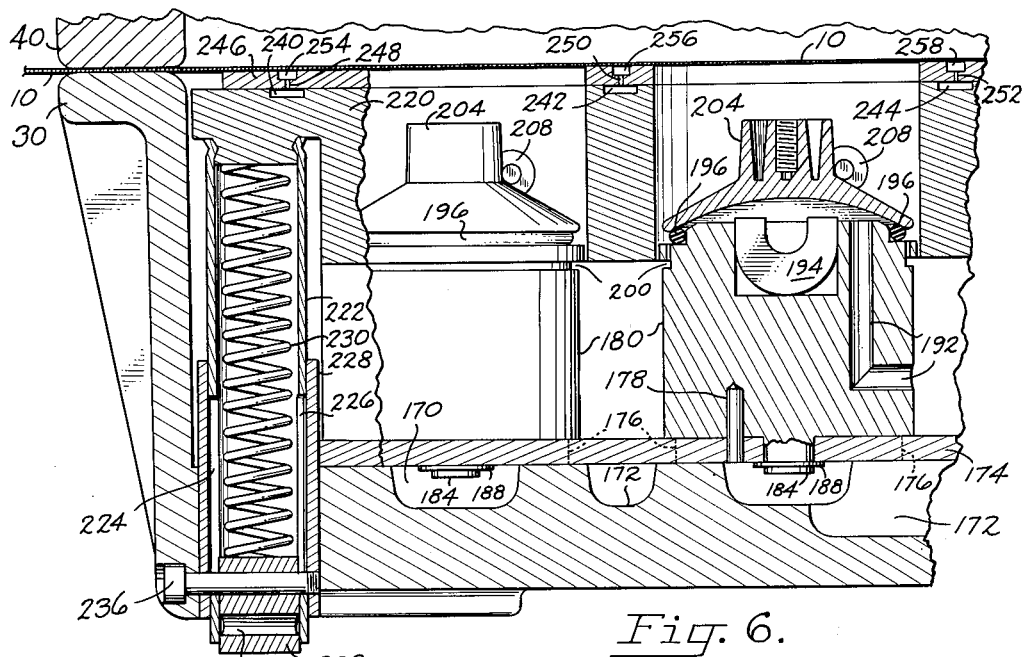
FIG. 6 is a fragmentary sectional view illustrating a mold box employed in the herein described apparatus for molding and forming a plastic sheet about articles to be packaged, the parts being in the rest or loading position which they assume preliminary to the packaging operation.
Figure 7:
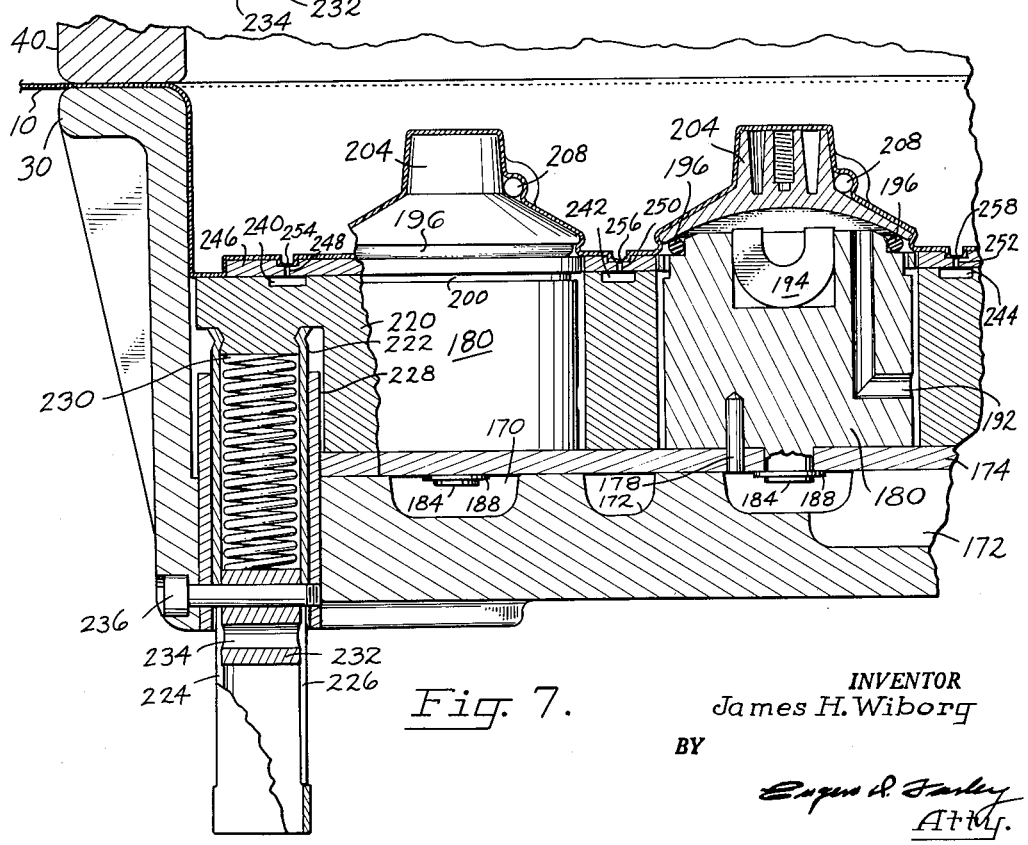
FIG. 7 is a fragmentary sectional view similar to FIG. 6 but illustrating the parts in the operating position wherein the plastic sheet is wrapped around the articles to be packaged.

Contemporaneously, springs 230 act to move platen 220 upwardly to the position of FIG. 6. This moves switches 310, 312, 314 to the full line position of FIG. 8. This action deenergizes solenoid 302, shutting off valve 304 and the flow of air into the mold box. It also de-energizes solenoid 320 so that cylinder 80 is made ready for the advancement of rack 74 which it drives. Still further, it closes a circuit including switches 312, 316, 318 and solenoid 326.

The latter solenoid in turn actuates air valve 322, admitting air behind the piston of cylinder 80 and extending rack 74. In this motion of the rack, wheels 52, 54 are driven. They therefore advance sheet 10 to the left as viewed in FIG. 8, by a distance determined by the length of the stroke. This removes the segment of the sheet which contains the articles just packaged and at the same time draws a fresh segment of the sheet into operating position opposite mold box 30, clamp 40 and heater 100. During movement of the sheet it is kept taut by means of tensioning roller 16 (FIG. 5.)

Extension of rack 74 closes switch 330. This in turn closes a circuit including this switch as well as solenoid 332. Energization of the latter solenoid retracts latch 160 (FIG. 2) so that spring 164 can eject the mold box from the latch assembly, opening switch 338 and making the mold box available to the operator.

Finally, the timer de-energizes solenoid 298, whereupon switch 300 is opened, air valve 304 is closed, and the system is ready for another cycle.

During the foregoing cycle the operator may be loading mold box 31 with articles to be packaged. Then at the conclusion of the cycle, box 30 is swung back and box 31 swung forwardly. This closes switch 338, so that upon closure of the master switches 334, 336, the second cycle may be initiated.

It also alters switch 288 from its full line to its dotted line position. This throws out the circuit controlling vacuum valve 290 and air valve 304 controlling the air pressure applied through conduit 260 to mold box 30, and throws in the circuits operating vacuum valve 294 and air valve 306 controlled respectively by solenoids 296 and 308. These valves control air pressure applied through conduit 262 to mold box 31.

This application is a continuation-in-part of the patent application of James H. Wiborg, Serial No. 537,413, filed September 29, 1955 and entitled Packaging Method, now abandoned.

It is to be understood that the form of the invention herewith shown and described is to be considered as a preferred example of the same, and that various changes in the shape, size and arrangement of parts may be resorted to without departing from the spirit of the invention as defined by the appended claims.

Having thus described my invention, I claim:

1. Apparatus for packaging a plurality of articles, comprising a base having spaced grooves therein defining a plurality of areas for supporting a plurality of articles in spaced apart relation, means for holding a normally hardened sheet of thermoplastic material across the exposed surface of the articles, means acting on the sheet for changing it temporarily from its normally hardened condition to a plastic condition, the base having an opening therein communicating a source of vacuum with the side of the sheet facing the base for drawing the sheet while in plastic condition against the base and exposed surface of the articles, thereby encasing the articles in the sheet, the base also having an opening therein communicating a source of vaccum with the grooves for drawing the sheet thereinto, thereby offsetting and thinning these portions of the sheet to form tear lines by which the encased spaced apart articles may be separated from each other while each article is retained encased in its portion of the sheet, the sheet thereafter being returned to its normally hardened condition.

2. Apparatus for packaging articles, comprising a base for supporting an article with one surface of the latter exposed, means for holding a normally hardened sheet of thermoplastic material across the exposed surface of the article, means acting on the sheet for changing it temporarily from its normally hardened condition to a plastic condition, the base having an opening therein communicating with the side of the sheet facing the base, and control valve means selectively communicating said opening with a source of vacuum and with a source of fluid pressure above atmospheric, respectively, for drawing the sheet while in plastic condition against the base and exposed surface of the article, thereby encasing the article in the sheet, the sheet thereafter being returned to its normally hardened condition, and for stripping the sheet end encased article from the base.

3. Apparatus for packaging articles, comprising a base, resilient annular sealing means supported on the base and adapted for mounting an article thereon, means for holding a normally hardened sheet of thermoplastic material across the exposed surface of the article, means acting on the sheet for changing it temporarily from its normally hardened condition to a plastic condition, the base having an opening therein communicating a source of vacuum with the interior of the sealing means whereby to draw and hold the article securely against the sealing means, the base also having an opening therein communicating a source of vacuum with the side of the sheet facing the base for drawing the sheet while in plastic condition against the exposed surface of the article, thereby encasing the article in the sheet, the sheet thereafter being returned to its normally hardened condition.

4. Apparatus for packaging articles, comprising a base, resilient annular sealing means supported on the base and adapted for mounting an article thereon, the sealing means having an outer periphery smaller than the adjacent periphery of the article whereby to form a peripheral channel therebetween, means for holding a normally hardened sheet of thermoplastic material across the exposed surface of the article, means acting on the sheet for changing it temporarily from its normally hardened condition to a plastic condition, the base having an opening therein communicating a source of vacuum with the interior of the sealing means whereby to draw and hold the article securely against the sealing means, the base also having an opening therein communicating a source of vacuum with the side of the sheet facing the base for drawing the sheet while in plastic condition against the base and exposed surface of the article, the base also having an opening therein communicating a source of vacuum with the peripheral channel whereby to draw and tuck the sheet material around the peripheral edge of the article, thereby encasing the article in the sheet, the sheet thereafter being returned to its normally hardened condition.

5. Apparatus for packing a plurality of articles, comprising a base having spaced grooves therein defining a plurality of areas for supporting a plurality of articles in spaced apart relation, resilient annular sealing means supported on each area of the base and adapted for mounting an article thereon, the sealing means having an outer periphery smaller than the adjacent periphery of the article whereby to form a peripheral channel therebetween, means for holding a normally hardened sheet of thermoplastic material across the exposed surface of the articles, means acting on the sheet for changing it temporarily from its normally hardened condition to a plastic condition, the base having an opening therein communicating a source of vacuum with the interior of each sealing means whereby to draw and hold the article securely against the sealing means, the base also having an opening therein communicating a source of vacuum with the side of the sheet facing the base for drawing the sheet while in plastic condition against the base and exposed surface of the articles, the base also having an opening therein communicating a source of vacuum with each peripheral channel whereby to draw and tuck the sheet material around the peripheral edge of the article, thereby encasing the articles in the sheet, the base also having an opening therein communicating a source of vacuum with the grooves for drawing the sheet thereinto, thereby offsetting and thinning these portions of the sheet to form tear lines by which the encased spaced apart articles may be separated from each other while each article is retained encased in its portion of the sheet, the sheet thereafter being returned to its normally hardened condition.

6. The apparatus of claim 5 wherein the openings in the base also communicate selectively with a source of fluid pressure above atmospheric for stripping the sheet and encased articles from the base.

7. The apparatus of claim 5 including magnet means on each area of the base arranged to underlie the article whereby to hold a magnetically susceptible accessory against the exposed surface of the article preliminary to encasing the article and its associated accessory in the sheet.

8. Apparatus for packaging articles, comprising a mold box having an upwardly directed open face and adapted to receive a plurality of articles, an air line communicating with and selectively delivering vacuum or compressed air to said mold box, means in the mold box for positioning said articles therein, means for longitudinally moving a flat thermoplastic sheet step-wise into position across the open face of said mold box, clamping means for clamping a portion of the sheet to the mold box, heating means for heating the clamped sheet to a softening temperature, means controlling said air line to apply vacuum to the side of the softened sheet facing said mold box to cause the plastic sheet to be wrapped about the article for a time permitting the sheet to cool and harden, and means for cutting off the vacuum and applying air pressure to the said surface of the sheet, the sheet movement means being operative after hardening of said sheet for withdrawing the formed sheet and article packaged therein from said mold box by movement longitudinally of said sheet.

References Cited in the file of this patent

UNITED STATES PATENTS

| | | |
|---|---|---|
| 1,276,193 | Doolittle | Aug. 20, 1918 |
| 1,980,022 | Whitehouse | Nov. 6, 1934 |
| 2,142,505 | Gammeter | Jan. 3, 1939 |
| 2,621,129 | Ramsbottom | Dec. 9, 1952 |
| 2,631,646 | Gannon | Mar. 14, 1953 |
| 2,690,593 | Abercrombie | Oct. 5, 1954 |
| 2,694,516 | Barnby | Nov. 16, 1954 |
| 2,750,719 | Wandelt | June 19, 1956 |

FOREIGN PATENTS

| | | |
|---|---|---|
| 201,271 | Australia | Apr. 7, 1955 |